Aug. 18, 1959
R. M. PAGE
PULSE DELAY SYSTEM
Filed Aug. 28, 1945
2,900,505
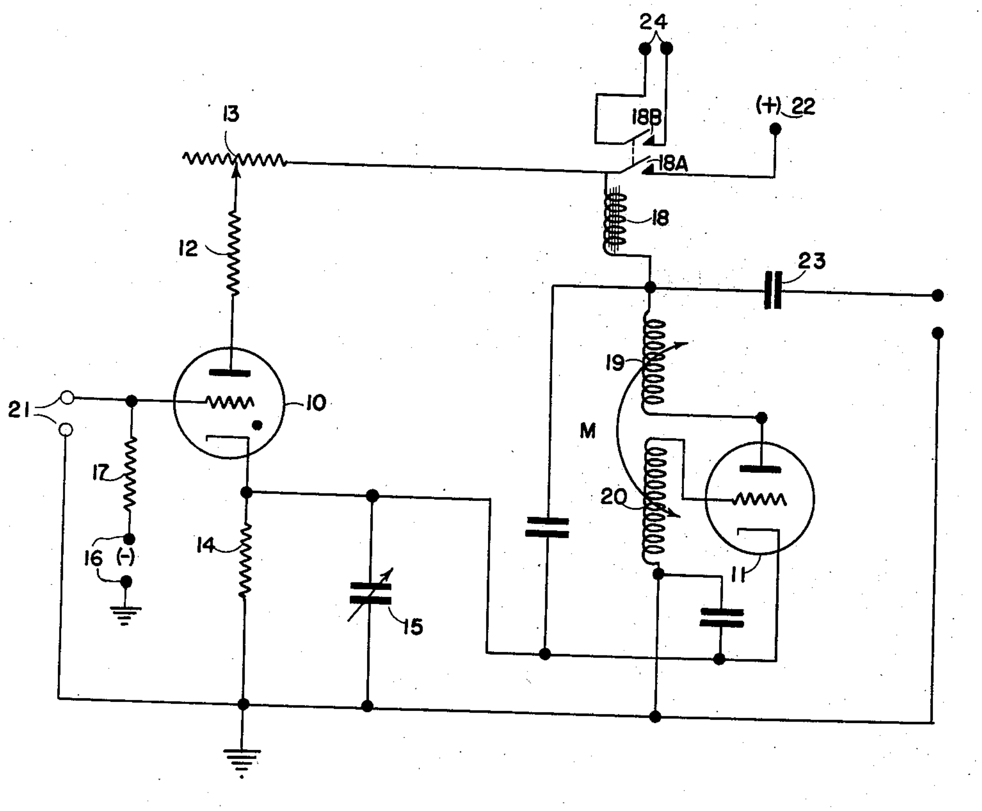
Inventor
ROBERT M. PAGE
By Ralph L. Chappell
Attorney 2,900,505
Patented Aug. 18, 1959

2,900,505

PULSE DELAY SYSTEM

Robert M. Page, Washington, D.C.

Application August 28, 1945, Serial No. 613,194
5 Claims. (Cl. 250—27)
(Granted under Title 35, U.S. Code (1952), sec. 266)

This invention relates to an electronic circuit for delaying and reshaping an electrical impulse and/or for delaying from a keying signal or the closing of a contact the start of operation of an auxiliary circuit component.

It is an object of this invention to provide a delay system for producing an output signal at a controllable instant in time subsequent to the application of an input signal.

Another object of this invention is to provide a pulse delay system in which the delay period is selectively variable.

Other objects and features of the present invention will become apparent upon a careful consideration of the following detailed description when taken together with the accompanying drawing, the single figure of which is a circuit diagram showing a specific embodiment of the present invention.

According to the broader aspects of the invention time delay is achieved through the cooperation of a voltage responsive device and a generator of a continually increasing amplitude voltage signal. The latter is arranged to start the generation of a voltage signal whose amplitude increases continually with time in response to the closing of a contact or the application of a voltage pulse marking the instant at which the delay interval is to be introduced. The voltage responsive device, which is preferably a vacuum tube, is so connected to the generator and arranged that when the output signal therefrom reaches a predetermined level the tube will undergo a change in conducting states. Connected to the tube and responsive to a change in tube conducting states is a reactor, a relay, or other suitable device which in response to such change in tube conducting states causes either the generation of a reshaped voltage pulse, or actuates an auxiliary circuit component, or both. Variability in the time delay is achieved by adjusting the average rate of increase in the voltage output from the voltage generator.

In the specific embodiment of the invention shown in the single figure of the drawing, the generator of a continually increasing amplitude voltage signal comprises tube component 10 and an associated time constant circuit. In the present case this time constant circuit comprises resistance 13 connecting the plate of tube 10 through contacts 18A of relay 18 to a source of positive supply voltage 22 and resistance 14 and capacitance 15 connecting the cathode of tube 10 to ground. The voltage responsive device comprises tube component 11 which is connected by means of a plate inductance 19 and a grid inductance 20 as an oscillator. The connection between the voltage responsive device and the generator of a continually increasing amplitude voltage signal is a direct conducting tie between the output, cathode, of tube 10 and the cathode of tube 11. Thus connected, the output from tube 10, which is a positive continually increasing amplitude signal initiated at the start of conduction by tube 10, operates to control the bias of tube 11 in such a manner that when the output signal from tube 10 reaches a predetermined level it will bias oscillator 11 to cut-off. To take full advantage of the change in operating conditions of the oscillator, the winding of relay 18 is connected in the plate current path of tube 11 so as to produce a reshaped output pulse and to simultaneously operate the relay 18.

In the standby condition of the circuit, relay 18 is deenergized and its two sets of contacts 18A and 18B are open as shown in the figure. In this condition the open contacts 18A prevent the application of power to either tube 10 or 11. Also in this condition of relay 18, the contacts 18B, which form for example, the starting or stopping switch of an auxiliary circuit component, are held open. At some instant in time prior to the desired time delay operation of the circuit, the contacts of relay 18 are closed (e.g. manually) placing the positive potential of source 22 on the plates of tubes 10 and 11. Tube 11 is thus set into oscillation at its resonant frequency determined by the magnitude of the inductances 19, 20, the distributed capacitances of the tube and associated wiring. Oscillation by tube 11 is maintained as a result of mutual coupling existing between the grid inductance 20 and the plate inductance 19. With tube 11 in an oscillatory condition, the average plate current drawn thereby flows through the winding of relay 18, thus actuating the relay to maintain closure of contacts 18A and 18B. Tube 10, however, is kept in a non-conducting state as a result of a negative potential maintained at its grid from the source 16.

If the start of the delay interval is to be initiated by a single momentary voltage pulse it is preferable that tube 10 be of the gas filled variety, which, once rendered conducting by a positive signal applied to its grid from input terminals 21 will remain in a conducting condition despite variations in grid voltage. The keying signal applied to the grid of the gas tube 10 may consist of a positive pulse obtained from an external circuit or simply the momentary grounding of the grid by the closure of a key, not shown, connected between the input terminals 21. With conduction through tube 10, which has relatively low resistance, the time constant of the charge path of capacitance 15 is determined primarily by the size of capacitance 15 and resistances 12, 13, and 14.

As capacitance 15 charges, the cathodes of both tubes 10 and 11 are driven positive to cause an increase in the negative bias voltage on tube 11 since the grid of tube 11 is direct connected to ground through inductance 20. As this bias voltage increases, a point will be reached at which oscillation of the circuits associated with tube 11 can no longer be maintained. The flow of plate current through tube 11 then creases abruptly. This sharp stoppage of current flow causes a correspondingly sharp rise in potential at the plate of tube 11 due to the energy stored in the inductance of the coil of relay 18. Also as the flow of current through the coil of relay 18 is stopped, the contacts of the relay are opened removing the polarizing potential from the plates of tubes 10 and 11. Deionization of the gas contained within tube 10 then takes place and that tube is thereby returned to a condition in which the grid may again exert control over plate current if relay 18 is subsequently closed as before. As conduction by tube 10 ceases, capacitance 15 discharges exponentially through resistance 14 to return to the original uncharged condition.

Although an oscillator is shown as the voltage responsive device, it is understood that an ordinary vacuum tube may be employed, however, the natural characteristics of an oscillator render the use of the same particularly desirable in this application. Once oscillating, the average plate current drawn by tube 11 remains substantially constant despite variations in biasing voltage. As this negative biasing voltage is increased during operation as a result of the charging of capacitance 15, the oscillator tube 11 continues to draw substantially constant average current until a bias point is reached at which oscillations can no longer be maintained. At this point, the oscillator 11 ceases functioning abruptly and no longer draws plate current.

It is apparent that several functions may be performed by the action of this circuit. Sharp pulses, delayed in time from the keying signal, may be obtained from the plate of tube 11 through a blocking capacitance 23. Furthermore, the inclusion of the additional contacts 18B on the armature of relay 18 permit the control of separate functions at the instant that relay 18 opens.

The length of the delay period is selectively variable by varying the size of either resistance 13 or capacitance 15, either of which causes a variation in the "time constant" of the charge path of capacitance 15 and hence alters the time required to charge capacitance 15 to the point which will cause stoppage of oscillation by tube 11. In this connection it should be noted that resistance 12 is essentially protective in function, serving primarily to prevent damage to tube 10 due to excessive current flow should operation be attempted with small values of resistance at 13.

Where the keying signal applied at terminals 21 is of long duration so that the production of the output signal from tube 11 will occur prior to the end of the keying signal, a vacuum tube may be employed in place of the gas tube 10. In this case the operation of the circuit is essentially the same as that previously discussed; except, the plate resistance of the vacuum tube while conducting will be somewhat higher than that of the gas tube necessitating some change in the size of either resistances 12, 13 or capacitance 15 to achieve the same time delay.

This system is primarily intended for "single stroke" operation, it being understood that repetitive operation of the circuit is possible if automatic means is provided for resetting relay 18 after each "stroke." Suitable systems for performing this function are well known in the art.

It is apparent that considerable modification of this basic idea is possible without exceeding the scope of the invention. Therefore, this invention is not to be limited except as necessitated by the spirit of the prior art and the scope of the appended claims.

The invention described herein may be manufactured and used by or for the Government of the United States of America for governmental purposes without the payment of any royalties thereon or therefor.

What is claimed is:

1. A delay circuit, comprising, a source of voltage, generating means including a gas tube for producing a voltage signal whose amplitude increases continually with time, said generator being adapted to be rendered operative in response to an input signal, a vacuum tube oscillator, said oscillator so connected to said source of voltage as to be in a state of operation and to said generator as to be rendered quiescent in response to the attainment of a predetermined level in the output signal from said generating means, a reactor so connected in the path of plate current flow for said oscillator as to produce a voltage pulse in response to the quiescence of said oscillator.

2. A delay circuit, comprising, a source of voltage, generating means including a gas tube for producing a voltage signal whose amplitude increases continually with time, said generator being adapted to be rendered operative in response to an input signal, a vacuum tube oscillator, said oscillator so connected to said source of voltage as to be in a state of operation and to said generator as to be rendered quiescent in response to the attainment of a predetermined level in the output signal from said generating means, a reactor including a relay winding connected in the path of plate current flow for said oscillator.

3. A delay circuit comprising generating means for producing a voltage signal whose amplitude increases continually with time, said generator being adapted to be rendered operative in response to an input signal, a vacuum tube oscillator connected to said generator to be rendered quiescent in response to the attainment of a predetermined level in the output signal of said generating means, and an impedance means connected in the path of plate current flow for said oscillator operable to produce a voltage pulse in response to the quiescence of said oscillator.

4. A delay circuit comprising generating means including a gas tube for producing a voltage signal whose amplitude increases continually with time, said generator being adapted to be rendered operative in response to an input signal, a vacuum tube oscillator connected to said generator to be rendered quiescent in response to the attainment of a predetermined level in the output signal of said generating means, and a reactor including a relay winding connected in the path of plate current flow for said oscillator.

5. A delay circuit comprising, generating means including a gas tube for producing a voltage signal whose amplitude increases continually with time, said generator being adapted to be rendered operative in response to an input signal, variable means controlling the rate of increase in the output signal of said generating means, a vacuum tube oscillator connected to said generator to be rendered quiescent in response to the attainment of a predetermined level in the output signal of said generating means, and a reactor including a relay winding connected in the path of plate current flow for said oscillator.

References Cited in the file of this patent

UNITED STATES PATENTS

| | | |
|---|---|---|
| 2,251,763 | Schoene | Aug. 5, 1941 |
| 2,418,425 | Poch | Apr. 1, 1947 |
| 2,428,125 | Nicholson | Sept. 30, 1947 |